United States Patent
Boswell et al.

(10) Patent No.: US 7,080,165 B1
(45) Date of Patent: Jul. 18, 2006

(54) SYSTEM AND METHOD FOR PROTECTING AGAINST UNAUTHORIZED USE OF SOFTWARE BY AUTOMATICALLY RECEIVING PCI VENDOR ID FROM VENDOR

(75) Inventors: Charles R. Boswell, Austin, TX (US); Timothy C. Maleck, Austin, TX (US); Brian Barnes, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1002 days.

(21) Appl. No.: 09/619,037

(22) Filed: Jul. 19, 2000

(51) Int. Cl.
*G06F 1/24* (2006.01)
*G06F 3/00* (2006.01)
*G06F 9/00* (2006.01)

(52) U.S. Cl. ............... 710/10; 710/8; 710/63; 710/301; 713/1; 713/2; 713/100; 713/300; 713/301

(58) Field of Classification Search ............ 710/8, 710/10, 63, 301; 713/1, 2, 100, 300, 301
See application file for complete search history.

(56) References Cited

U.S. PATENT DOCUMENTS

| | | | | |
|---|---|---|---|---|
| 5,948,076 | A * | 9/1999 | Anubolu et al. | 710/8 |
| 6,195,766 | B1 * | 2/2001 | Maxwell et al. | 714/38 |
| 6,609,170 | B1 * | 8/2003 | Lehwalder et al. | 710/301 |
| 6,611,912 | B1 * | 8/2003 | Maleck et al. | 713/100 |
| 6,647,451 | B1 * | 11/2003 | Barmore | 710/301 |
| 6,748,515 | B1 * | 6/2004 | Hendrickson et al. | 712/32 |
| 2003/0005274 | A1 * | 1/2003 | Bresemann et al. | 713/1 |

* cited by examiner

*Primary Examiner*—Tammara Peyton
(74) *Attorney, Agent, or Firm*—Kelly K. Kordzik; Winstead Sechrest & Minick P.C.

(57) ABSTRACT

At system power on, a query is sent from a PCI or host-based controller to an attached codec for the vendor specific identification code associated with that codec. The PCI/host controller then sets its PCI vendor and subvendor ID's to match the specific system comprised of the controller and codec devices. That vendor specific identification code is then utilized within the PCI enumeration process to search for the specific modem driver associated with that codec.

21 Claims, 3 Drawing Sheets

Points of clarification for PCI vendor identification based on CODEC ID:

PCI PnP uses a standard 16 DWORD configuration space.
There is an option 48 DWORD space allocated in memory directly following the 16 DWORD vendor and device ID space.

This 64 DWORD device configuration table is contained in the device controller.

The pointer is a state machine that redirects the BIOS/Operating System PCI device query to the appropriate device/vendor ID table.

The BIOS/OS reads this table as it would any other PCI device. This requires no additional algorithms or changes to the system. It does not require any exotic BIOS snooping routines, unlike other automatic ID schemes.

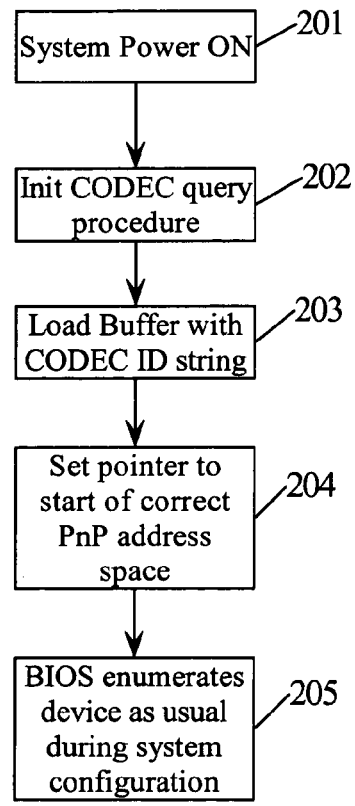

FIG. 2

ND METHOD FOR PROTECTING
SYSTEM AND METHOD FOR PROTECTING AGAINST UNAUTHORIZED USE OF SOFTWARE BY AUTOMATICALLY RECEIVING PCI VENDOR ID FROM VENDOR

CROSS-REFERENCE TO RELATED APPLICATION

The present application is related to U.S. patent application Ser. No. 09/498,156, entitled "Virtual Rom For Device Enumeration," which is hereby incorporated by reference herein.

TECHNICAL FIELD

The present invention relates in general to data processing systems, and in particular, to peripheral devices used within such data processing systems.

BACKGROUND INFORMATION

Modems are now a required component in a Windows-based personal computer ("PC") according to Microsoft's PC99 specification. Given the increase in processing speed in PC's, the modem function is being largely implemented in software running on the PC processor under the Windows operating system. This is done in order to continue reducing the cost of the modem component and to provide increased flexibility of software upgrades.

The architecture of the software consists of driver software and a minimal hardware set. The hardware provides an interface to the host computer memory and to the analog phone line. An industry standard has been provided that defines the interface between the driver software and the hardware for soft modems. This standard is the Intel AC97 specification. This specifies a common hardware interface to any soft modem drivers. Given that the PC architecture is standardized and now the modem hardware is standardized, all that remains proprietary is the actual modem software. The bulk of the intellectual property for the soft modem is contained in the soft modem driver. Given that modems are required equipment for PC99 compliant PC's, and the modem is now essentially software, there is a risk of piracy for the vendors of the soft modem intellectual property. A typical business model for the soft modem company is based on royalties per copy. The problem is how to track the proliferation of copies of the soft modem drivers to account for royalty disbursements.

Therefore, what is needed in the art is a solution for how to track the number of PC's that are utilizing a soft modem functionality. As a result, there is a need for a technique for authentication before the driver software will perform the soft modem function on a given codec (coder/decoder).

SUMMARY OF THE INVENTION

The present invention addresses the foregoing need by providing a process for identifying a soft modem interface for an identification code and then setting a vendor ID in the computer PCI configuration space. This happens during the BIOS plug and play ("PnP") enumeration process, before the operating system becomes available. The authentication block performs two functions that enable it to authenticate a codec. The first step is a codec query protocol that reads a hidden ID from an unpublished register within the codec. The second half of the process is to use the characteristics of the device itself as a means of identification.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates a flow diagram in accordance with the present invention; and

DETAILED DESCRIPTION

Figure 1:
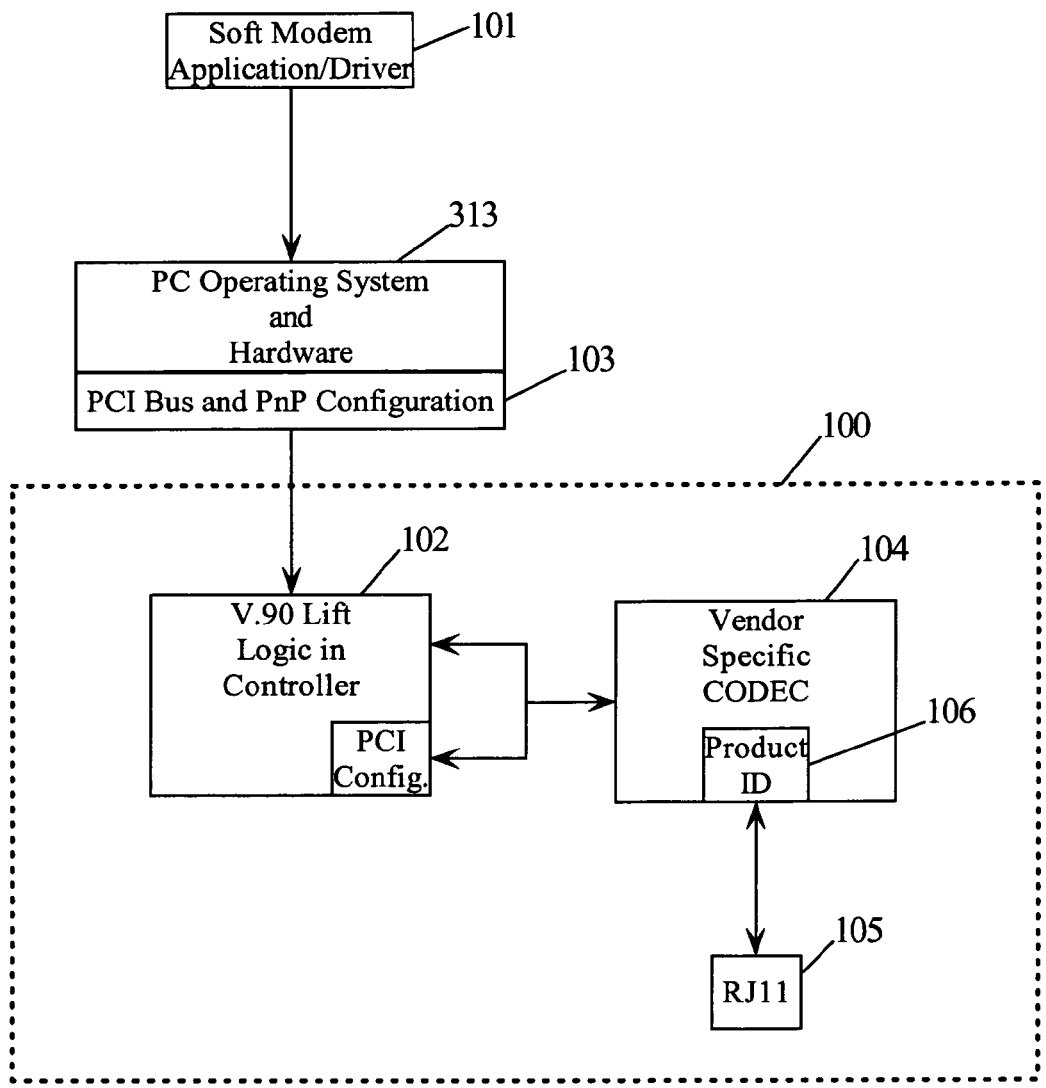
FIG. 1 illustrates an embodiment of the present invention.

In the following description, numerous specific details are set forth such as specific peripheral devices, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention is implemented with respect to use of a data processing system, and a PCI (Peripheral Component Interconnect) bus technology. Since there are many references regarding the PCI bus and its implementation of plug-n-play (PnP) capabilities, no further discussion is provided. Furthermore, the present invention pertains to enumeration of peripheral devices, which is discussed in the cross-reference related application previously incorporated by reference.

Figure 3:
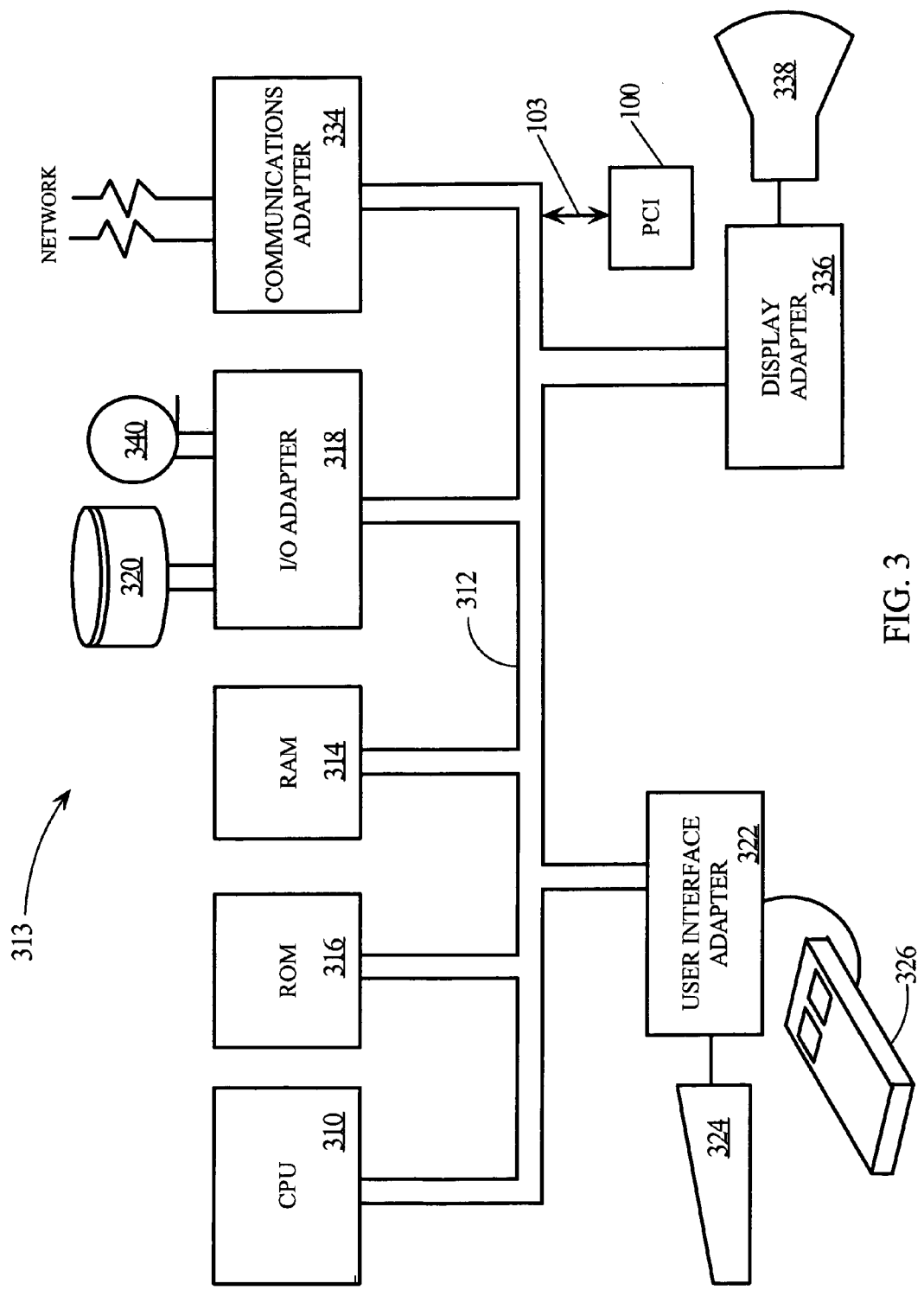
FIG. 3 illustrates a data processing system configured in accordance with the present invention.

Referring to FIG. 3, there is illustrated a PC operating system and hardware 313 configured in accordance with the present invention having central processing unit (CPU) 310, such as a conventional microprocessor, and a number of other units interconnected via system bus 312. Data processing system 313 includes random access memory (RAM) 314, read only memory (ROM) 316, and input/output (I/O) adapter 318 for connecting peripheral devices such as disk units 320 and tape drives 340 to bus 312, user interface adapter 322 for connecting keyboard 324, mouse 326, and/or other user interface devices such as a touch screen device (not shown) to bus 312, communication adapter 334 for connecting data processing system 313 to a data processing network, and display adapter 336 for connecting bus 312 to display device 338. CPU 310 may include other circuitry not shown herein, which will include circuitry commonly found within a microprocessor, e.g., execution unit, bus interface unit, arithmetic logic unit, etc. CPU 310 may also reside on a single integrated circuit.

Coupled to system 313 via a PCI bus 103 is PCI board 100, which includes a PCI controller with V.90 lift logic 102 and one or more vendor specific codecs 104 coupled to the controller 102 and to an RJ11 connector 105, as illustrated in FIG. 1. The soft modem application/driver 101 runs on top of the operating system 313.

Referring to FIGS. 1 and 2, the system 313 is powered on in step 201. Next, in step 202, an initial codec query procedure is implemented whereby a state machine, which is implemented within the controller 102, will query the codec 104 for its unique identifier code (product ID) using AC97 transactions. This unique identifier code is in an addressable register 106 within the codec 104. This product ID code is the vendor specific ID appointed to the codec manufacturer by the PCI committee, which is an industry consortium that assigns numbers so that a driver or operating system can read this vendor specific product ID for identifying the codec's manufacturer.

Thereafter in step 203, this product ID code is then placed in a temporary buffer within controller 102. It should be noted the controller 102 could be a stand alone PCI device or a PCI controller integrated into other core logic devices.

There are several possible mechanisms besides a state machine within controller 102 that may be implemented to read the product code 106. One alternative is to embed a small program within a ROM on the codec 104, which will include some executable code to read the product ID code 106 into a buffer in controller 102.

In step 204, the product ID code is then compared to a table of such codes to determine the VENDOR_ID needed for configuring the codec 104. An address register that is used by the AC97 controller 102 is set with the location of the configuration address space for the VENDOR_ID. The state machine will then copy the VENDOR_ID into this address register, which will be used later for enumeration of the codec 104.

Thereafter, in step 205, the BIOS will enumerate the PCI bus and build a table for later use by the Windows operating system. The table will identify required drivers by the VENDOR_ID for each PCI device 104. This is the standard PCI enumeration cycle, whereby the VENDOR_ID is used to select a modem driver 101 created specifically for the codec 104. If the driver cannot be found, a dialog box can be programmed to pop up and ask the user for the specific driver software. In this way, a vendor of driver software can be ensured that, a driver cannot simply be copied without also needing the hardware (codec) needed by the driver 101.

The present invention is distinct from the prior art in that the prior art hard codes the VENDOR_ID's as part of the manufacturing process of the PCI bus.

The effect of the present invention is to authenticate a vendor specific codec before the soft modem driver will provide the modem function to the PC. This ensures that copies of the soft modem driver can be tied to the sales of vendor specific codecs, thereby providing a hindrance to software piracy. This system also allows system manufacturers to use multiple software/codec vendors by providing the required configuration information to the system in a transparent manner. This simplifies the design process, lowering costs and complexity to the original equipment manufacturers and designers.

Although the present invention and its advantages have been described in detail, it should be understood that various changes, substitutions and alterations can be made herein without departing from the spirit and scope of the invention as defined by the appended claims.

What is claimed is:

1. A method comprising the steps of:
reading an identification code from a memory location on a codec; the identification code unique to a manufacturer of the codec; and
loading a driver as a function of the identification code.

2. The method as recited in claim 1, wherein the driver is loaded only if the unique identification code is read from the codec.

3. The method as recited in claim 2, wherein the loading step further comprises the step of:
comparing the identification code to a list of codes having drivers associated therewith.

4. The method as recited in claim 1, wherein the driver is supplied by the manufacturer.

5. The method as recited in claim 1, wherein the identification code is assigned by an industry standards organization.

6. The method as recited in claim 2, wherein the loading step is conducted as part of a PCI enumeration process.

7. A PCI controller adaptable for coupling to a data processing system comprising:
a codec query routine operable for reading an identification code from a memory location on a codec, the identification code unique to a manufacturer of the codec; and
a loader routine operable for loading a driver as a function of the identification code, wherein the driver is loaded only if the unique identification code is read from the codec.

8. The PCI controller as recited in claim 7, wherein the loader further compares the identification code to a list of codes having drivers associated therewith.

9. The PCI controller as recited in claim 7, wherein the driver is supplied by the manufacturer.

10. The PCI controller as recited in claim 9, wherein the identification code is assigned by an industry standards organization.

11. The PCI controller as recited in claim 7, wherein the loading is conducted as part of a PCI enumeration process.

12. A data processing system comprising:
a processor;
a memory device coupled to the processor by a local bus;
an input device coupled to the processor by the local bus;
an output device coupled to the processor by the local bus;
an operating system operable for running on the system;
a driver stored in the memory device;
a PCI bus coupled to the local bus;
a controller coupled to the PCI bus;
a codec coupled to the controller; and
a connector coupled to the codec and adaptable for coupling to a telecommunications network, wherein the PCI controller further comprises:
a codec query routine operable for reading an identification code from a memory location on a codec, the identification code unique to a manufacturer of the codec; and a loader routine operable for loading a driver as a function of the identification code, wherein the driver is loaded only if the unique identification code is read from the codec.

13. The data processing system as recited in claim 12, wherein the loader further compares the identification code to a list of codes having drivers associated therewith.

14. The data processing system as recited in claim 12, wherein the driver is supplied by the manufacturer.

15. The data processing system as recited in claim 13, wherein the identification code is assigned by an industry standards organization.

16. The data processing system as recited in claim 12, wherein the loading is conducted as part of a PCI enumeration process.

17. A controller comprising:
   means for reading an identification code from a memory location on a codec, the identification code unique to a manufacturer of the codec; and
   means for loading a driver as a function of the identification code.

18. The controller as recited in claim 17, wherein the loading means further comprises means for loading the driver only if the unique identification code is read from the codec.

19. The controller as recited in claim 18, wherein the loading means further comprises:
   means for comparing the identification code to a list of codes having drivers associated therewith.

20. The controller as recited in claim 19, wherein the driver is supplied by the manufacturer.

21. The controller as recited in claim 20, wherein the identification code is assigned by an industry standards organization.

* * * * *